(12) United States Patent
Dickinson

(10) Patent No.: US 6,574,657 B1
(45) Date of Patent: Jun. 3, 2003

(54) METHODS AND APPARATUSES FOR FILE SYNCHRONIZATION AND UPDATING USING A SIGNATURE LIST

(75) Inventor: Peter Dickinson, Huntington, NY (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/303,958

(22) Filed: May 3, 1999

(51) Int. Cl.[7] .............................................. G06F 15/16
(52) U.S. Cl. ....................... 709/203; 709/217; 709/229; 707/1; 707/203
(58) Field of Search .................................. 709/200–203, 709/216–219, 231–232, 229, 235–237; 707/1, 8–10, 200–204; 717/10–12; 714/6–7

(56) References Cited

U.S. PATENT DOCUMENTS

| | | | |
|---|---|---|---|
| 5,008,853 A | 4/1991 | Bly et al. ................... | 345/751 |
| 5,694,596 A | 12/1997 | Campbell ................... | 709/215 |
| 5,729,735 A | 3/1998 | Meyering ..................... | 707/10 |
| 5,752,039 A | 5/1998 | Tanimura ..................... | 717/11 |

(List continued on next page.)

FOREIGN PATENT DOCUMENTS

| | | | | |
|---|---|---|---|---|
| WO | WO 94/23371 A1 | 10/1994 | ........... | G06F/15/00 |
| WO | WO 94/25923 A1 | 11/1994 | ........... | G06F/15/21 |

OTHER PUBLICATIONS

Kris Coppieters, "A Cross–Platform Binary Diff", pp. 1–7, Dr. Dobb's Journal, May 1995.

Darrell Diem, "Wireless Data and Minimum Airtime Software", pp. 1–14, Dr. Dobb's Journal, Dec. 1993.

Freed, Les. "Symantec Mobile Update," First Looks section of *PC Magazine Online*, Jun. 10, 1998.

"Keeping Road Warriors on Track," Mind Your Own Business, Jun. 1998, Market Place Publishing, United Kingdom, vol. 21, No. 6, p. 49.

Schneier, Bruce. "One–Way Hash Functions," *Dr. Dobb's Journal*, Sep. 1991, vol. 16, No. 9, pp. 148–151.

*Primary Examiner*—Bharat Barot
(74) *Attorney, Agent, or Firm*—Fliesler Dubb Meyer & Lovejoy LLP

(57) ABSTRACT

A server computer generates an update file for transmission to a client computer that permits the client computer to generate a copy of a current version of a subscription file from a copy of an earlier version of the subscription file. For each segment of the current version of the subscription file, the server computer searches an earlier version of a signature list for an old segment signature which matches a new segment signature corresponding to the segment. When a match is detected, the server computer writes a command in the update file for the client computer to copy an old segment of the client computer's copy of the earlier version of the subscription file into the client computer's copy of the current version of the subscription file, where the old segment corresponds to the segment for which a match was detected. When no match is detected, the server computer writes a command into the update file for the client computer to insert a new segment of the current version of the subscription file into the client computer's copy of the current version of the subscription file, where the new segment of the current version of the subscription file is written into the update file. The new segment of the current version of the subscription file may be compressed, encrypted, or both, by the server computer. When the update file is completed, the server computer transmits the update file to the client computer as an executable attachment via electronic mail. The update file is only generated when the server computer determines the subscription file has changed. The server computer periodically monitors the subscription file to determine if it has been altered before generating an update file.

24 Claims, 12 Drawing Sheets

U.S. PATENT DOCUMENTS

| | | | |
|---|---|---|---|
| 5,787,247 A | * | 7/1998 | Norin et al. ................. 709/220 |
| 5,794,258 A | | 8/1998 | Ishikawa et al. ............. 345/751 |
| 5,819,274 A | | 10/1998 | Jackson, Jr. .................. 707/10 |
| 5,835,911 A | | 11/1998 | Nakagawa et al. .......... 707/203 |
| 5,864,837 A | * | 1/1999 | Maimone ....................... 707/1 |
| 5,890,164 A | * | 3/1999 | Nielsen ....................... 707/201 |
| 5,913,032 A | | 6/1999 | Schwartz et al. ........... 709/213 |
| 6,012,087 A | * | 1/2000 | Freivald et al. .............. 709/218 |
| 6,014,135 A | | 1/2000 | Fernandes .................... 709/203 |
| 6,058,428 A | * | 5/2000 | Wang et al. ................. 709/232 |
| 6,073,007 A | | 6/2000 | Doyle ......................... 709/203 |
| 6,101,507 A | * | 8/2000 | Cane et al. .................. 707/204 |
| 6,151,708 A | * | 11/2000 | Pedrizetti et al. .............. 717/11 |
| 6,161,125 A | * | 12/2000 | Traversat et al. ........... 709/203 |

* cited by examiner

METHODS AND APPARATUSES FOR FILE SYNCHRONIZATION AND UPDATING USING A SIGNATURE LIST

CROSS-REFERENCE TO RELATED APPLICATION

This Application is related to the following Application, which was filed filed May 3, 1999, and is incorporated herein by reference:

"Methods and Apparatuses for Single Connection File Synchronization and Workgroup File Update", Application Ser. No. 09/304,295.

BACKGROUND OF THE INVENTION

1. Field of the Invention

The present invention relates to the field of personal computers which access files on network drives and which utilize electronic mail systems. Specifically, the present invention involves the synchronization of the local copies of files on user's client computer hard disk to the current versions of the files on a network drive.

2. Discussion of the Related Art

As more and more business information moves from analog to digital formats, the relatively newfound ability to create, amend, and revise information spontaneously and frequently has brought with it challenges for corporate users. Revenue results can now be easily aggregated and updated in near real time, sales presentations can be amended regularly, and changes made to business documents. However, causing these changes to effectively trickle down through the organization without causing a digital flood is a challenge.

Companies have responded to the threat by carefully creating structures for organizing, storing, and sharing these electronic files. Organizations have moved from file servers to intranet sites to combinations of both to meet the need of the corporate user. While these structures are clearly effective means of storing, sharing, and organizing information, they do not address the fact that users have very individual information needs. They also do not resolve the obstacle users face who do not have the time to spend looking for changes. An effective paradigm for addressing the problem of individual needs and delivering changes to documents can be found in the emerging category of "Push Technology."

As its simplest definition, push is the process of automatically delivering user-requested information electronically. It is not an application, but merely a function or feature in a product. There are clear distinctions between the three different categories of push-based application: content, software, and document.

Content push is the first mover. Conventional products focus on delivering breaking news and information to user desktops automatically. Instead of the user constantly surfing multiple Web sites for stock quotes, news, weather, etc., conventional products aggregate and broadcast information automatically according to individual user preferences. Many companies incorporate "push" functionality into their products.

Following acceptance by hundreds of thousands of early adopters, many push-based applications started the move into the corporate world. For IS Managers, "push-based technologies" were seen as an uncontrollable avenue for terabytes of graphics and HTML to come through the corporate firewall and network, filling local hard drives.

Microsoft and Netscape entered the fray with their own "push" clients — IE 4.0 Active Desktop and Communicator's Netcaster, respectively. Rather than spurring the growth of content delivery, however, the effect of the push entries has been to call into question the value of delivering Web content to user hard drives. The value is questioned not only in terms of relevance, but also its effects and load on corporate networks. The automated information flow becomes a flood through the Internet gate-ways of corporations threatening the stability and reliability of the network infrastructure itself.

Within the corporate world, the future of content push remains in limbo. Uncertainty over standards and overall value have caused the market to trip on the initial momentum and slow to a crawl. However, what is questioned here is not the value of automating delivery or "push," but rather the value of what is being pushed.

Software Push is another important objective. Microsoft and Marimba, among others, have recognized the importance and potential of "Electronic Software Distribution" (ESL) or "software push" as a way of addressing the need to seamlessly deliver software updates across the network with the goal of directly impacting the total cost of ownership. The requirements for software distribution are dramatically different from content distribution. For one, the "content" in software delivery is, by its very nature, deemed critical. To reduce the impact of supporting multiple versions of products across the corporate network, near-simultaneous deployment is imperative. Companies that do not use some form of software push technologies require dedicated individuals to make the rounds updating software by reinstalling or applying patches for each personal computer and laptop.

Rather than aggregating and displaying information, software push transparently delivers one specific piece of information and applies it to user systems or applications. Files tend to be very large and the delivery of these files must be well-managed. Incremental downloading becomes important to reduce frustration and bandwidth associated with broken and lost connections. Management of software updating also needs to be centralized and MIS-controlled. In addition, the primary value of the application is to IS personnel and only indirectly to for the end-users.

A good example of software push is Marimba's Castanet, which allows Java applications to be distributed and updated seamlessly and automatically without user intervention. This same approach to Java programming can be, and is being, applied to C-language programs as well. The case of content push vs. software push makes it clear that the importance lies in the distinction between the data being delivered — and not the delivery mechanism itself.

The Next Phase is Electronic Document Delivery. The final frontier in digital push is "electronic document delivery" or EDD. It deals with delivering changes or "updates" to the same physical files (like software push), but the files themselves are highly personalized (like content push). Different from content push, these files exist in the form of sales presentations (PowerPoint), spreadsheets (Excel and Lotus 1,2,3), and reports and plans (Word or WordPerfect). These are the types of documents for which companies currently invest millions of dollars in file servers and intranet technologies in order to share among respective workgroups. The important distinction here between content and document push is the fact that EDD delivers data that currently exists in its native format within corporations and whose value is clearly understood by the company, MIS, and the end-user. With the recognized features, the willingness to invest in infrastructure is more likely.

Within conventional environments, users have access to files and can download or copy them on-demand, whenever they are aware that the network file document changes. File servers and intranet servers act as document repositories waiting passively to be accessed. The reality is that these files change erratically and the user can never really know when a file has changed.

As a result, those who need to have the most current documents are required to perform hit-and-miss network browsing and checking which is time-consuming, unproductive, and frustrating. Even if the changes are scheduled, the user is still required to manually access, retrieve and manage those changes.

For mobile users, the problem of knowing about and accessing changes to network-based files is compounded by infrequent access to the corporate network. In addition, when remote from the office, users need to establish connections to the network via dial-up networking technologies, then search and browse the network over an often slow, unreliable connection. The productivity losses and frustrations are simply multiplied.

As is apparent from the above discussion, a need exists for an efficient and effective mechanism for allowing a computer user to have copies of the current versions of network files on his client computer

SUMMARY OF THE INVENTION

Conventionally, those who need to have the most current versions of computer files are required to perform hit-and-miss network browsing and checking which is time-consuming, unproductive, and frustrating. An object of the present invention is to provide a mechanism by which a user can be automatically provided with a current version of a file to which he subscribes. Another object of the present invention is to communicate the current version of the file in an efficient manner. According to the present invention, a server computer monitors network files and folders stored on the network for changes and then sends the user email notifications and updates when monitored items change.

According to the present invention, a server computer generates an update file for transmission to a client computer that permits the client computer to generate a copy of a current version of a subscription file from a copy of an earlier version of the subscription file. The server computer periodically reads the subscription file from the network drive and divides the subscription file into variable-length segments based upon a segment delimiter. The server computer computes a signature for each segment and stores the segment signature along with the beginning position and length of each segment in a current version of the signature list. The server computer also maintains the earlier version of the signature list.

For each segment of the current version of the subscription file, the server computer searches an earlier version of a signature list for an old segment signature which matches a new segment signature corresponding to the segment. When a match is detected, the server computer writes a command in the update file for the client computer to copy an old segment of the client computer's copy of the earlier version of the subscription file into the client computer's copy of the current version of the subscription file, where the old segment corresponds to the segment for which a match was detected. The command need only specify the location within the earlier version of the file where the old segment is stored, rather than the actual data that is stored at this position. This information is found in the signature list in the beginning location and size fields. The beginning location field is preferably expressed as a number of bytes from the beginning of the file. At the client computer, when this location information is combined with the offset of the beginning of the client computer's copy of the earlier version of the subscription file, the correct old segment can be copied into the client computer's copy of the current version of the subscription file. The size of the copy command is negligible in comparison to the size of the segment to which it pertains. This savings reduces the size of the update file, and thus reduces the connection time in communicating the update file to the client computer.

When no match is detected in the earlier version of the signature list, the server computer writes a command into the update file for the client computer to insert a new segment of the current version of the subscription file into the client computer's copy of the current version of the subscription file, where the new segment of the current version of the subscription file is written into the update file. Because the new segment of the current version of the subscription file contains the actual data of the new segment, the new segment of the current version of the subscription file may be compressed to reduce the size, encrypted for security, or both, by the server computer before being written into the update file.

When the update file is completed, the server computer transmits the update file to the client computer as an executable attachment via electronic mail. The update file is only generated when the server computer determines that the subscription file has changed. The server computer periodically monitors the subscription file to determine if it has been altered before generating an update file. The user determines the periodicity of the checks to determine if the file has been altered, and if so, to generate the update file and send it as an electronic mail.

These and other features of the present invention are apparent from the Drawings which are described in narrative form in the Detailed Description of the Invention.

Figure 1:
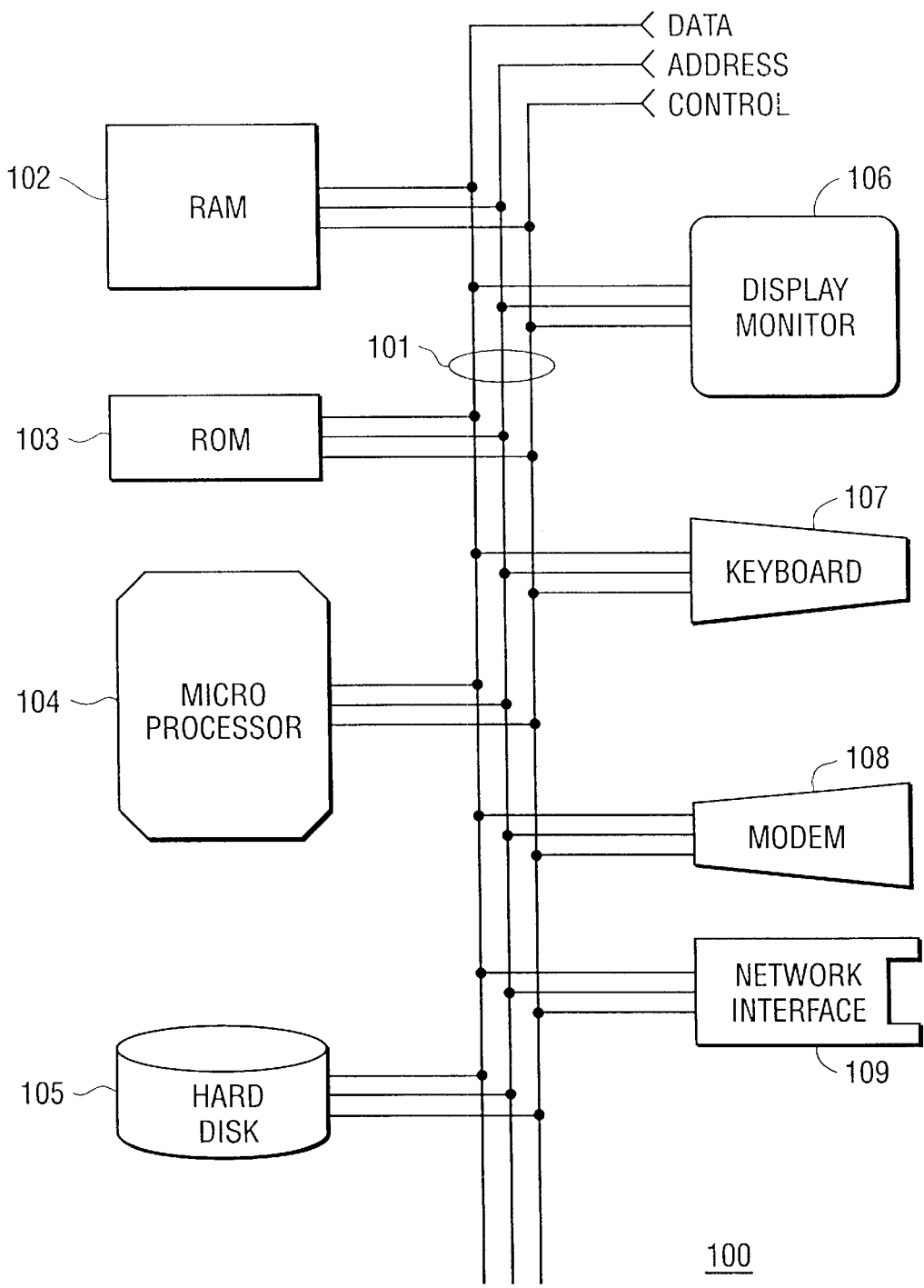
FIG. 1 illustrates a general purpose computer architecture suitable for implementing the methods according to the present invention.

The Figures are more thoroughly described in narrative form in the Detailed Description of the Invention.

DETAILED DESCRIPTION OF THE INVENTION

Although intranets are growing in popularity, they are not likely to replace file servers any time soon. File servers are one of the primary ways to store and share data on corporate networks due to their sheer simplicity for posting and retrieving files. Users have grown accustomed to working with network drives, even to the extent where in which data is actually stored directly on the network, rather than on their own hard drives. The intranet, on the other hand, requires that documents be "posted" or "uploaded" to a web server, usually by a select group of individuals. Thus, making documents available to others goes from the simple task of copying a file onto a network directory to submitting a file to be processed by others. On the recipient end, it involves activating a browser, going to the appropriate URL or IP address, finding the document on a page and downloading it (as opposed to a simple drag-and-drop file copy to the hard drive).

In spite of the varying degrees of complexity, there is value in both methods of file sharing. Since virtually all Intranet documents are converted forms of some other type of document file, the most current information is often found in native files on the LAN, rather than information posted to a web page. In addition, not all changing files used in the day-to-day life of the mobile professional are found on the intranet, whereas all intranet-based files can typically be found on the network. Thus, browser-access alone is not always adequate to serve the needs of document delivery.

According to research, the most popular method of connecting to the corporate network is through electronic mail. Not surprisingly, electronic mail is treated as a mission critical application. For remote or mobile professionals, it is the one connection they do make to the network on a recurrent basis. This familiar, reliable system is well-suited for electronic document delivery (EDD). So well-suited, in fact, that many departments and users currently rely on electronic mail as a primary way to send documents to other users. Even with existing network and Intranet infrastructures, a typical response to the suggestion, "It's now posted on the site, you can download it" is "I know, but could you send it to me by email? It's easier". The simplicity of using electronic mail as a single connection to a wide variety of information sources is very compelling to both users and corporations, with the caveat that the files being sent must not impede the network, the mail server, or the end-user's experience. This means, for truly effective document push, file size has to be addressed, first and foremost.

Electronic Document Delivery involves more than just the physical process of sending out documents automatically. The indiscriminate sending or downloading of full-size files places a heavy burden on network bandwidth, IS, and the mobile professional. Intelligence needs to be built into the entire process of delivery to be truly effective and valuable to both MIS and users.

For truly effective Document Delivery, server-based intelligence is required. It is needed for detecting and sending changed files, but also as well as for detecting what changes have been made and packaging only those changes as efficiently as possible. If only 50 cells of 5000 have changed in a spread-sheet, it does not make sense to send the entire file again. If only a single slide in a 50-slide presentation changes, it does not make sense to re-send the entire 2 MB file.

Symantec Mobile Update™ (Symantec Mobile Update is a trademark of Symantec Corporation and its subsidiaries) according to the present invention, through a combination of server-based "delta technology" and client-based "update agent technology", adds "intelligence" to document delivery by automatically offering a seamless way of receiving changes to corporate documents. The next section discusses the technology used by Mobile Update according to the present invention to bring "intelligence" to document delivery.

Mobile Update according to the present invention is designed primarily to serve the mobile professional as the target user, who relies on copies of the most up-to-date documents to be effective, but who is not always connected to the network to access changes. In addition, the mobile user is challenged with both slow connection speeds to the network (typically 28.8 Kb/sec modem), as well as the hassles of getting and staying connected. The Mobile Update solution according to the present invention is comprised of a server portion (for tracking files on the network and processing changes) and a client portion (for managing document "subscriptions" and for incorporating changes into existing documents).

The Mobile Update Client portion is used to create and manage subscriptions to network documents. The process of selecting files to be monitored is referred to as "subscribing". Users browse to the network directory where the desired files are stored and select either individual files or folders (excluding sub-folders). Once selected, the user then determines the polling or monitoring interval for the server to check for changes and also what to do when changes occur, i.e., package and send file changes or simple notification. Once the subscription is set up, the information is passed to the server and stored in its database.

The Mobile Update Server according to the present invention acts as an "electronic assistant" on the network, tracking documents for changes. It polls files or subfolders at either user-defined intervals for any changes to date, time stamps. When it detects a change, it checks the integrity of the file, then decides whether it needs to deliver the actual changes or simply notify send notice of a file change.

FIG. 1 illustrates a general purpose computer system 100 suitable for implementing the methods according to the present invention. The general purpose computer system 100 includes at least a microprocessor 104. The general purpose computer may also include random access memory 102, ROM memory 103, a keyboard 107, and a modem 108. All of the elements of the general purpose computer 100 are optionally tied together by a common bus 101 for transporting data between the various elements. The bus 101 typically includes data, address, and control signals. Although the general purpose computer 100 illustrated in FIG. 1 includes a single data bus 101 which ties together all of the elements of the general purpose computer 100, there is no requirement that there be a single communication bus 101 which connects the various elements of the general purpose computer 100. For example, the microprocessor 104, RAM 102, and ROM 103, are alternatively tied together with a data bus while the hard disk 105, modem 108, keyboard 107, display monitor 106, and network interface 109 are connected together with a second data bus (not shown). In this case, the first data bus 101 and the second data bus (not shown) are linked by a bidirectional bus interface (not shown). Alternatively, some of the elements, such as the microprocessor 102 and RAM 102 are connected to both the first data bus 101 and the second data bus (not shown), and communication between the first and second data bus occurs through the microprocessor 102 and RAM 102. The network interface 109 provides communication capability to a local area network LAN using an ethernet connection, for example. The modem 108 allows the computer 100 to communicate through the telephone system. The methods of the present invention are executable on any general purpose computer system such as the 100 illustrated in FIG. 1, but there is clearly no limitation that this computer system is the only one which can execute the methods of the present invention.

Figure 2:
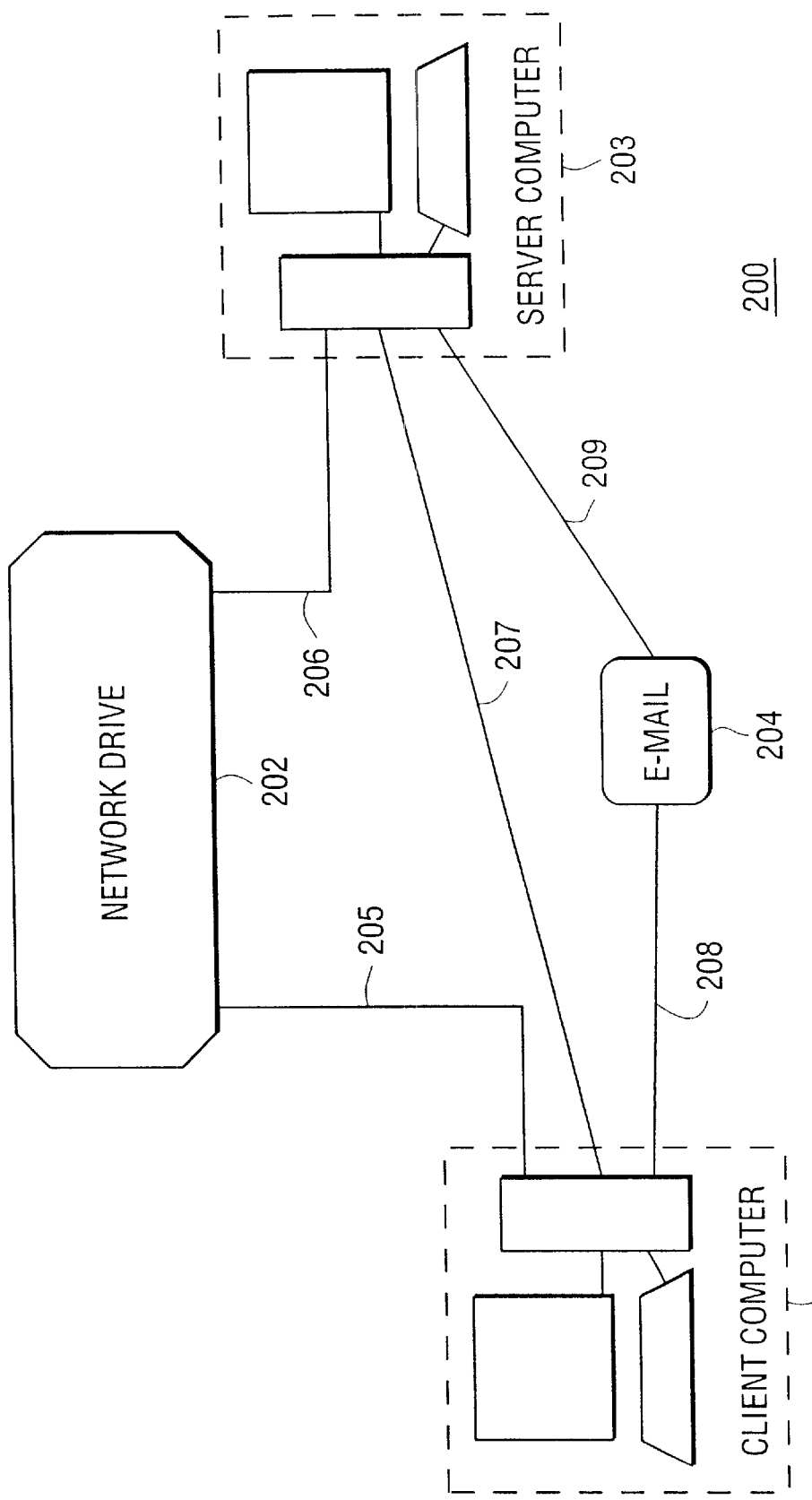
FIG. 2 illustrates a network of computers suitable for implementing the methods according to the present invention.

FIG. 2 illustrates a network of computers suitable for implementing the methods according to the present invention. A client computer 201 is connected to a network drive 202 through link 205. A server computer 203 is connected to a network drive 202 through a link 206. The client computer 201 and server computer 203 are logically connected by a link 207 for communication between them. The server computer 203 is logically connected to an electronic mail facility 204 through link 209. Client computer 201 is logically connected to the electronic mail facility 204 through link 208. The logical connections 207, 208, and 209 are not necessarily physical connections. For example, the client computer 201 is alternatively a remote computer which periodically connects to the network drive 202 through a modem. In this event, the modem (not shown) provides the physical connection through which the logical connections 205, 207, and 208 are implemented.

FIG. 2 illustrates the interaction between client, server, and network according to the present invention. The user browses the network through link 205 from his client computer 201 to determine the files to which he wishes to subscribe. The client computer 201 sends the subscription information to the server computer 203 through logical link 207. The server computer 203 polls the network 202 through link 206 for changes to the subscription files. The server sends update files to the client computer 201 through the email facility 204 through logical link 209. The client computer receives update files through the logical link 208.

Figure 3:
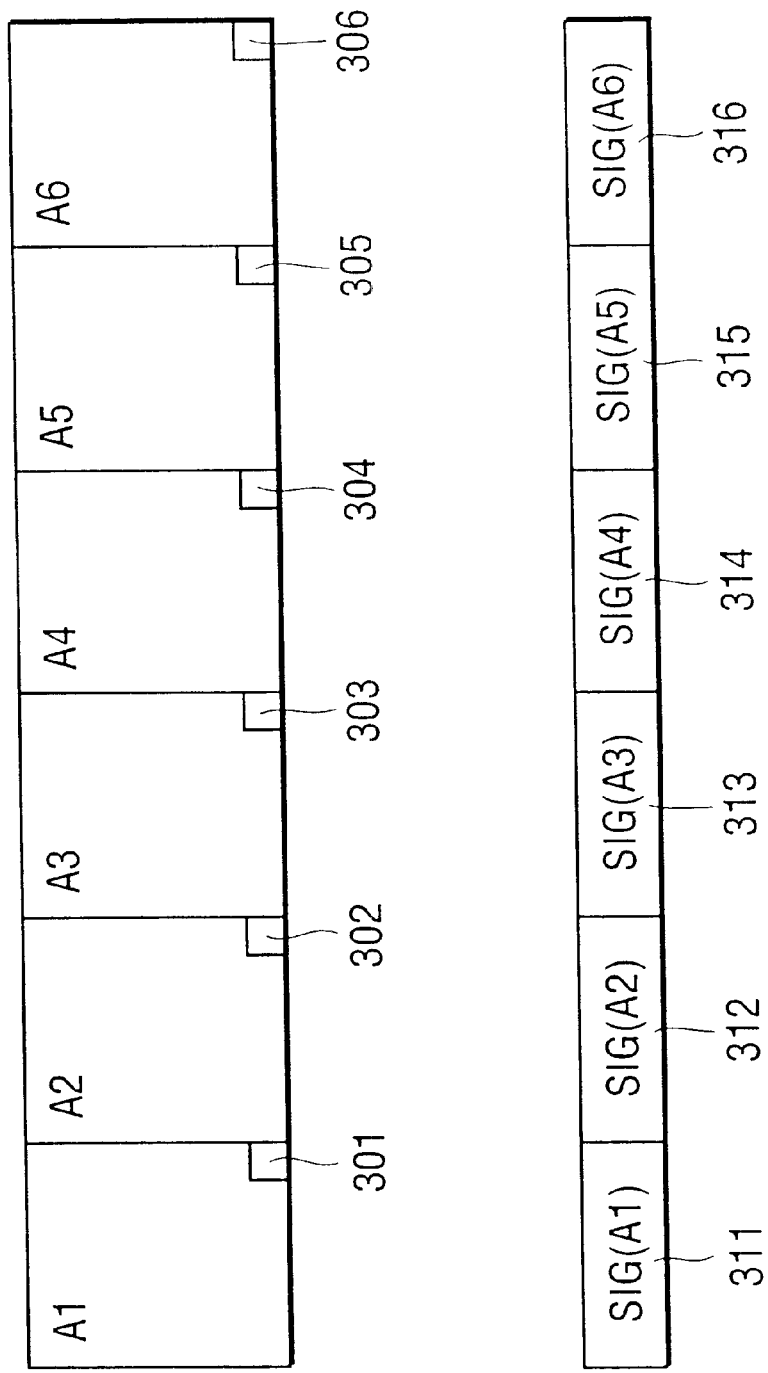
FIG. 3 illustrates an earlier version of a subscription file broken into six segments and the signatures corresponding to the six segments suitable for use with the methods according to the present invention.

Symantec's Delta Technology according to the present invention has been optimized to detect and process changes quickly and efficiently, while concurrently maintaining the integrity of the file. When a use first "subscribes" to a file, the server takes a "digital snapshot" that forms the basis for determining changes made to the file in the future. The server reads the file from the network and determines the most efficient "delimiter" or "dividing point" to break the file into segments as shown in FIG. 3. A digital 'snapshot' is comprised of a series of segments which define the overall contents and structure of a file. A file can be segmented into hundreds, if not thousands, of segments depending on the file size and type.

FIG. 3 illustrates an earlier version of a subscription file broken into six segments and the signatures corresponding to the six segments suitable for use with the methods according to the present invention. Segments A1 through A6 represent variable length portions of the earlier version of the subscription file. The ends of each of the segments (A1 through A6) are determined by segment delimiters 301 through 306. The segment delimiters 301 through 306 are specific portions of data, perhaps bytes, that are statistically determined to be an optimal, or at least acceptable, division point for the variable length segments A1 through A6 for the earlier version of the subscription file. Signatures 311 through 316 are fixed length values derived from the variable length segments A1 through A6. The signatures 311 through 316 may be determined by any one of a variety of hashing methods or signature algorithms. In the presently preferred embodiment, the signatures A1 through A6 are computed using the cyclic redundancy check (CRC). However, any signature algorithms may be used according to the present invention. For example, MD5 can be used to derive a fixed length digital signature from the variable length segments.

Figure 4:
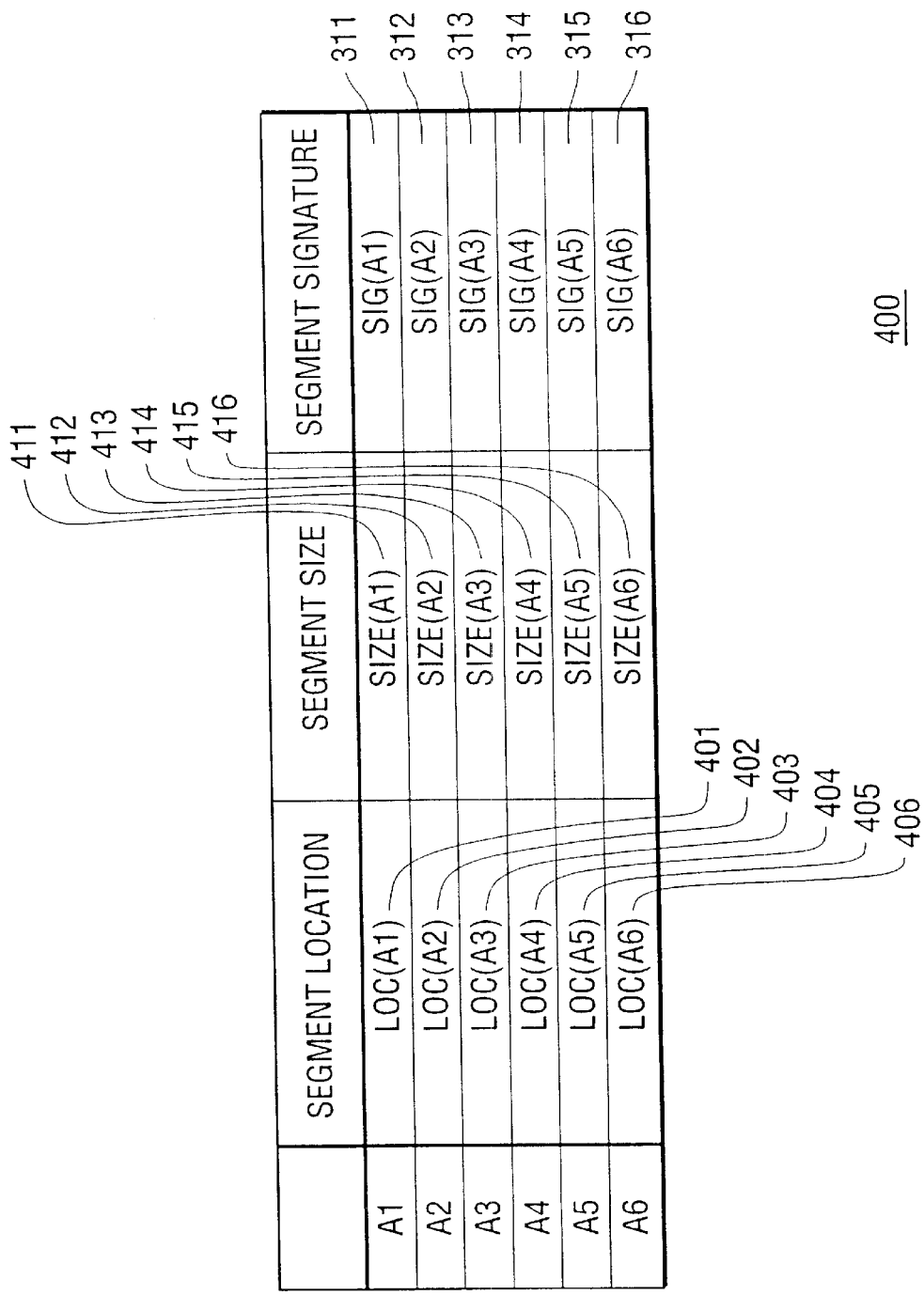
FIG. 4 illustrates an earlier version of a signature list according to the present invention corresponding to the earlier version of the subscription file shown in FIG. 3.

FIG. 4 illustrates an earlier version of a signature list according to the present invention corresponding to the earlier version of the subscription file shown in FIG. 3. The signature list 400 shown in FIG. 4 further includes the starting locations 401 through 406 of each of the segments A1 through A6 shown in FIG. 3. The starting locations 401 through 406 are preferably represented as byte address locations relative to the beginning of the earlier version of the subscription file. Thus, an offset representing the location of the beginning of the earlier version of the subscription list is combined with each of the segment location values 401 through 406 to determine the address of the beginning of each of the segments within the address space within which the segments A1 through A6 are stored. The signature list 400 also includes a segment size field which stores the size of each of the variable length segments A1 through A6 as a number of bytes within the variable length segment to which it corresponds. The segment location and segment size allow the addresses of all of the data within the segment to be computed. However, it should be noted that the information necessary to compute the addresses of the pieces of data within each segment could be represented in some alternative manner. For example, instead of attaching the segment size within the signature list, the ending location of each segment could alternatively be stored according to the present invention.

Figure 5:
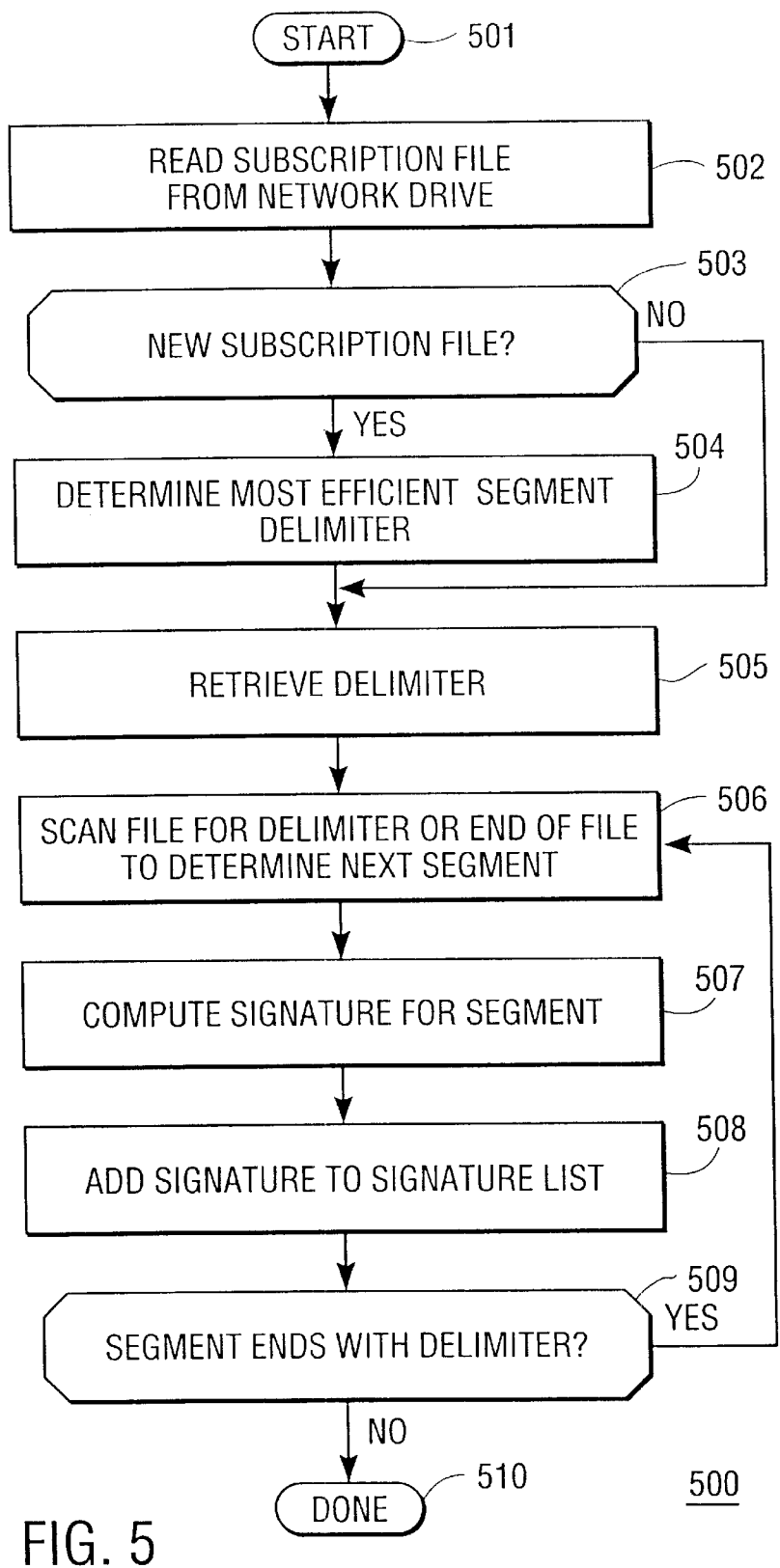
FIG. 5 is a flow chart illustrating a method according to the present invention of building a signature list corresponding to a subscription file.

FIG. 5 is a flowchart illustrating a method according to the present invention of building a signature list corresponding to a subscription file. The method starts at step 501. At step 502, the subscription file is read from the network drive 202. If the subscription file read from the network drive is a new subscription file, test 503 delivers the method to step 504 where the most efficient segment delimiter is determined for that new subscription file. Thus, the byte value which represents the segment delimiters 301 through 306 shown in FIG. 3 are computed at step 504 the first time that the subscription file is read. If the subscription file read from the network drive in step 502 is not a new subscription file, then the task 503 delivers the message to step 505, where the delimiter corresponding to the subscription file is retrieved from a table (not shown) which stores the values of the segment delimiters which correspond to each of the subscription files that the server computer 203 monitors. After the segment delimiter corresponding to the subscription file is retrieved at step 505, the method scans the file from the beginning for the delimiter in order to determine the first variable length segment corresponding to that subscription file. If the end of the file is reached before the delimiter is found, then step 506 marks that as a segment, and that will be the last segment corresponding to the subscription file. Thus, the segment delnimter 306, which pertains to the last segment A6, is the last byte in the file, and is not necessarily the same value as the other segment delimiters 301 through 305. At step 507, the signature for the variable length segment is computed. At step 508, the signature is added to the signature list along with the beginning location and segment size corresponding to the segment. Test 509 determines whether or not the segment ends with the delimiter. If the segment ends with the delimiter, then it is not the last segment in the subscription file, and therefore the test 509 returns the message to step 506 so that the next variable length segment can be determined. If the segment does not end with the delimiter, then it is assumed that it is the end of the file, and the method 500 is completed. At this point, the signature list corresponding to the subscription file has been computed and stored.

Figure 7:
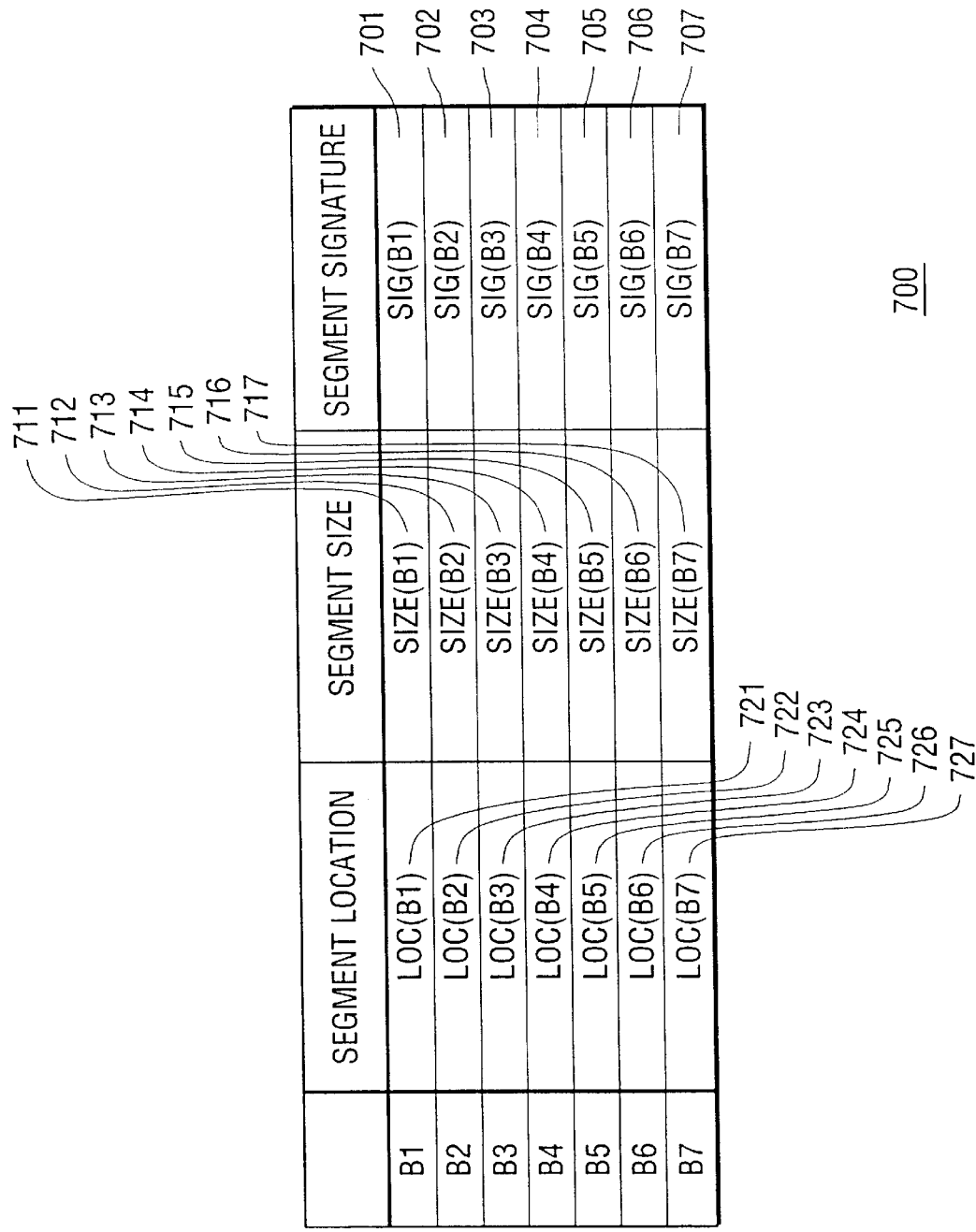
FIG. 7 illustrates a current version of a signature list according to the present invention corresponding to the current version of the subscription file shown in FIG. 6.
Figure 8:
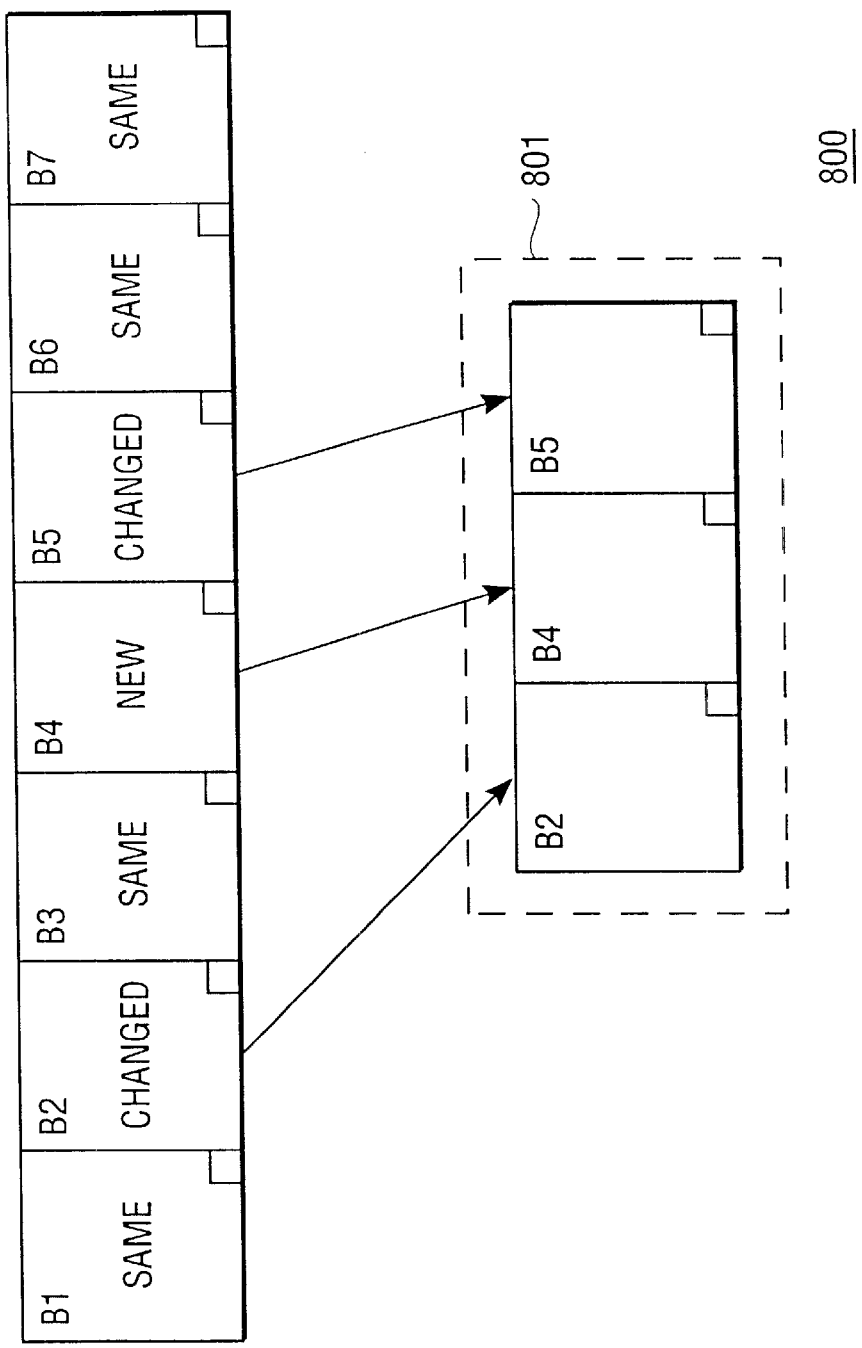
FIG. 8 illustrates the correspondence of the current version of the subscription file to the earlier version of the subscription file and the segments which are communicated to the client computer from the server computer in an update file according to the present invention.

When the server 203 polls the subscription file at a future time and detects a change, a second "snapshot" is generated using the same process as the first snapshot as shown in FIG. 7. As shown in FIG. 8, the new or changed segments are accompanied by unchanged segments, depending on the number and severity of the changes made to the file. The Delta Engine according to the present invention then compares the two sets of segments to determine which segments have been altered, which ones are new and which ones have remained unchanged, as illustrated in FIG. 8.

Figure 6:
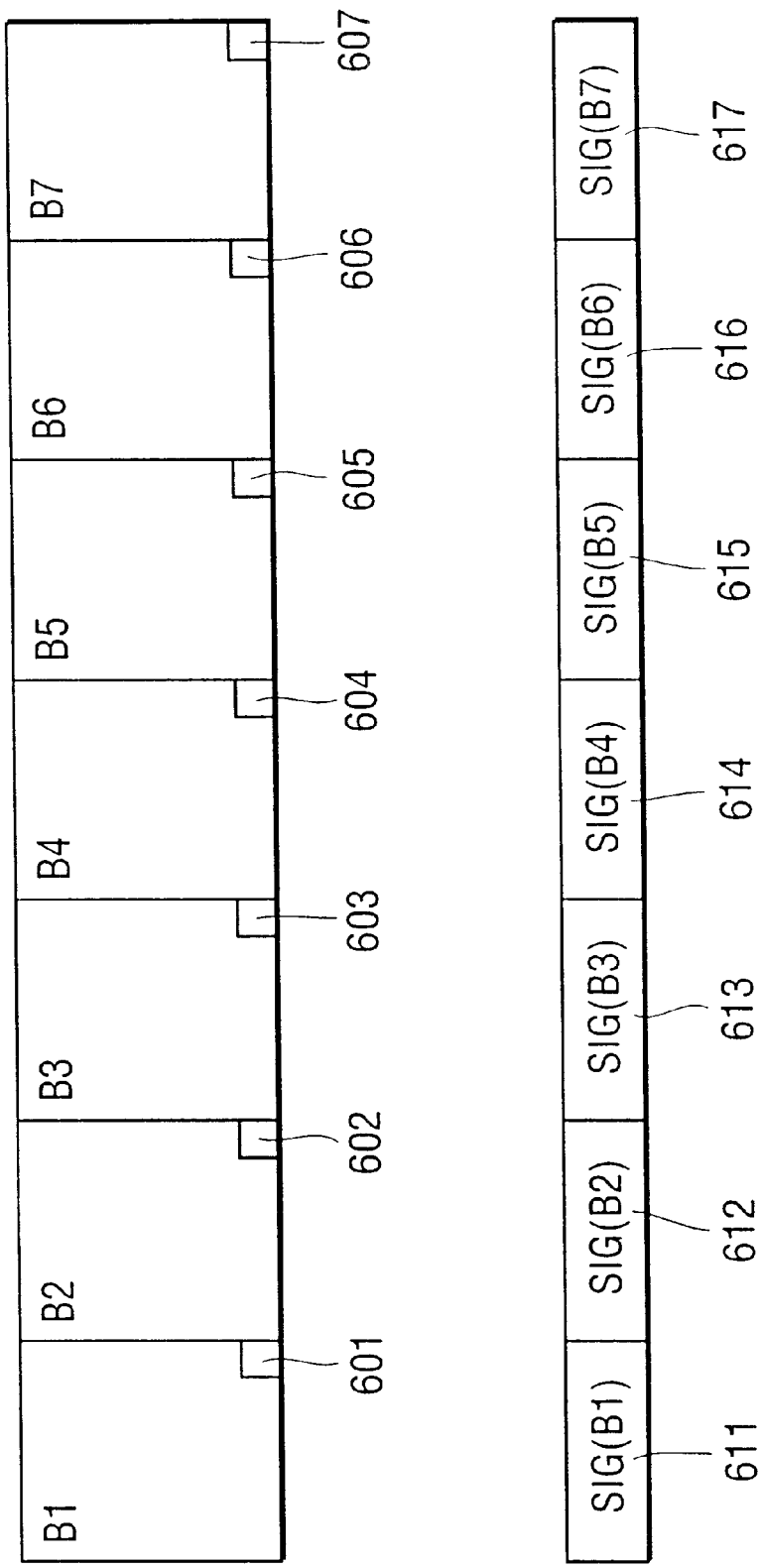
FIG. 6 illustrates a current version of the subscription file shown in FIG. 3 broken into seven segments and the signatures corresponding to the seven segments suitable for use with the methods according to the present invention.

FIG. 6 illustrates a current version of the subscription file shown in FIG. 3 broken into seven segments and the signatures corresponding to the seven segments suitable for use with the methods according to the present invention. Segment delimiters 601 through 607 represent byte codes which were determined for this subscription file to indicate the end of each of the segments B1 through B7. Signatures 611 through 617 represent fixed length signatures computed from each of the seven segments B1 through B7.

FIG. 7 illustrates a current version of a signature list according to the present invention corresponding to the current version of the subscription file shown in FIG. 6. The signature list 700 includes the segment signatures 701 through 707 corresponding to the variable length segments B1 through B7 shown in FIG. 6 and the corresponding segment locations 721 through 727 representing the beginning position of each of the segments B1 through B7 as well as the segment sizes 711 through 717 corresponding to each of the segments B1 through B7.

The engine according to the present invention extracts new or changed segments and bundles these into a file, called an Update File. This file is then optionally compressed to reduce its size even further. At its simplest, an Update File contains just the changes made to a file, in a compressed state, as shown in FIG. 8.

FIG. 8 illustrates the correspondence of the current version of the subscription file to the earlier version of the subscription file and the segments which are communicated to the client computer from the server computer in an update file according to the present invention. As discussed above, the earlier version of the subscription file shown in FIG. 3 and the current version of the subscription file shown in FIG. 6 pertain to the same file name. They are different versions of the same file. FIG. 8 shows the current version of the subscription file. FIG. 8 is annotated to show which segments within the current version of the subscription file are the same or identical to a segment within the earlier version of the subscription file. As shown in FIG. 8, each of the segments B1, B3, B6, and B7 are the same as a corresponding segment within the earlier version of the subscription file shown as segments A1 through A6 in FIG. 3. However, segments B2, B4, and B5 are each different from any of the segments A1 through A6 shown in FIG. 3.

According to the present invention, the new or changed segments B2, B4 and B5 are extracted from the current version of the subscription file stored on the network drive 202 by the server computer 203, and are packaged in an update file 801 for transmission to the client computer 201 shown in FIG. 2 so that the client computer 201 can build a copy of the current version of the subscription file from its copy of the earlier version of the subscription file.

Figure 9:
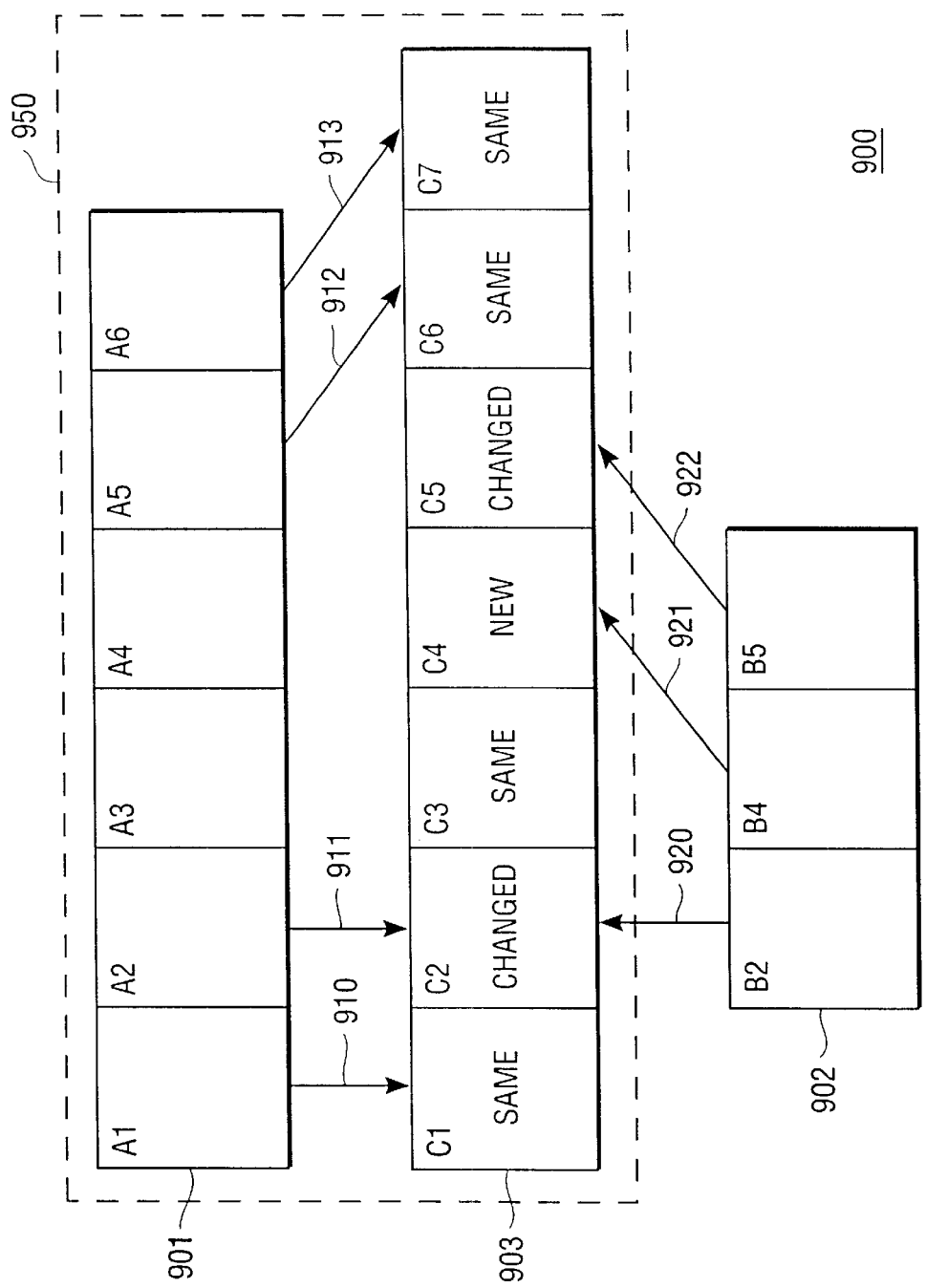
FIG. 9 illustrates the creation of a current copy on the client computer of the current subscription file from a copy of the earlier version of the subscription file on the client computer using the update file.

FIG. 9 illustrates the creation of a current copy on the client computer of the current subscription file from a copy of the earlier version of the subscription file on the client computer using the update file 801 shown in FIG. 8. FIG. 9 shows the copy of the earlier version of the subscription file 901 as well as the data contents of the update file 902 as it corresponds to the client computer's copy of the current version of the subscription file 903. FIG. 9 shows arrows 910 through 913 which indicate segments which the client computer 201 can copy from its earlier version of the subscription file into the current version of the subscription file. Specifically, segment A1 is illustrated by arrow 910 as being copied into segment C1 of the copy of the current version. Similarly, segment A3 may be copied into segment C3, segment A5 may be copied into segment C6 and segment A6 may be copied into segment C7. Arrows 920 through 922 show segments which are inserted from the update file 902 into the copy of the current version of the subscription file 903. Specifically, segment B2 is inserted from the update file 902 into the copy of the current version of the subscription file at segment C2. Segment B4 is inserted from the update file 902 into the copy of the current version 903 at segment C4. Segment B5 is inserted from the update file 902 into the copy of the current version 903 at segment C5. Dotted rectangle 950 illustrates data that is resident on the client computer 201. Update file 902 is communicated to the client computer 201 through an electronic mail facility 204. Thus, the update file 902 must be transmitted to the client computer 201 through whatever communication link the client computer 201 uses to access its electronic mail 204. This link 208 shown in FIG. 2 may be a modem, an ethernet connection, or some other communication device. As is illustrated in FIG. 9, the present invention maximizes the information already stored on the client computer 201 and minimizes the information needed to be transmitted to the client computer 201 in order to create the copy of the current version of the subscription file.

Specifically because segments A1, A3, A5, and A6 are identical to corresponding segments in the current version of the subscription file, they need not be transmitted to the client computer 201 through the electronic mail facility 204. Only the changes B2, B4, and B5 are communicated to the client computer 201.

Figure 10:
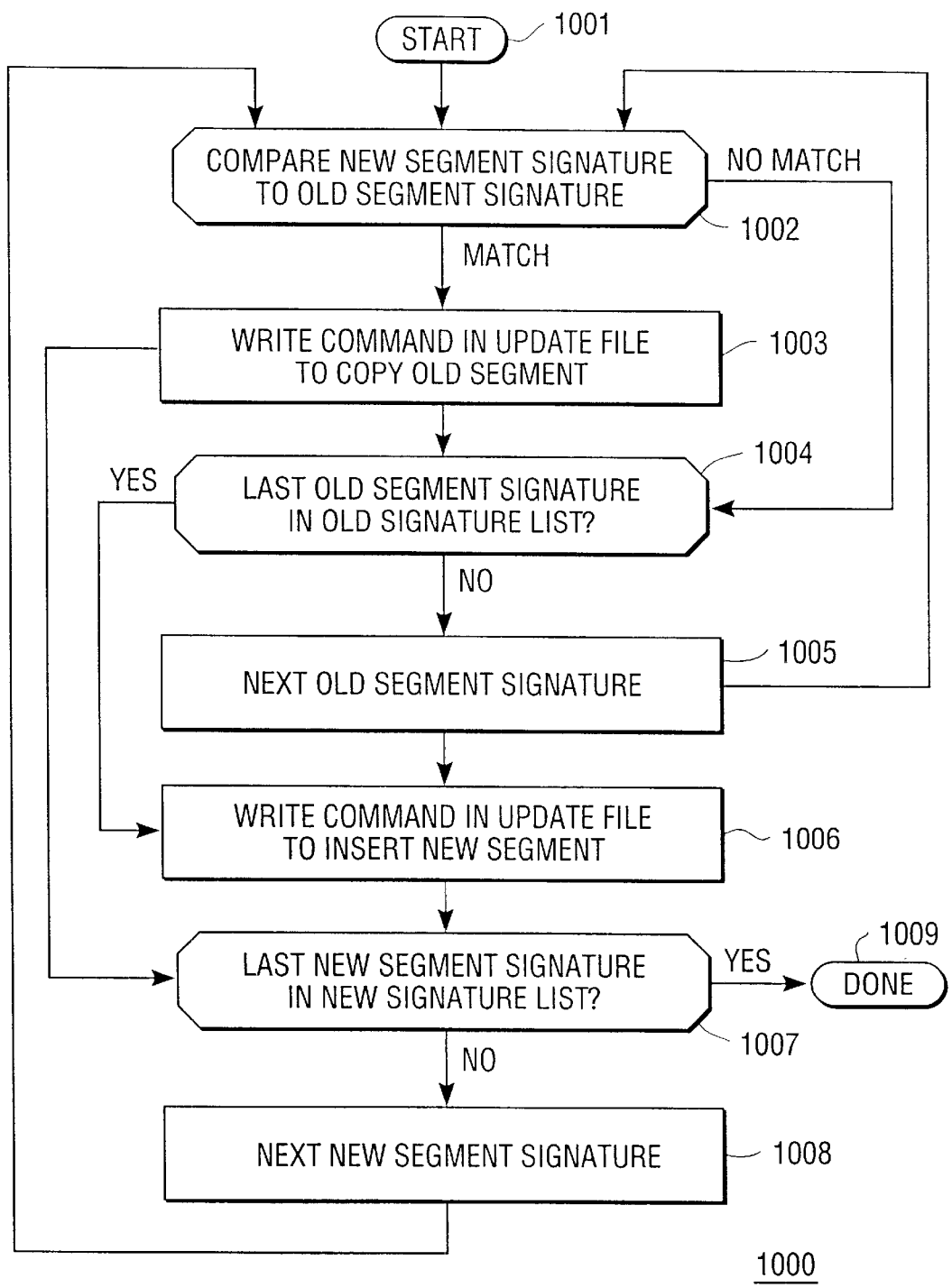
FIG. 10 is a flow chart illustrating a method according to the present invention of generating an update file from the current version of the subscription file and the current and earlier versions of the signature list.

FIG. 10 is a flowchart illustrating a method according to the present invention of generating an update file from the current version of the subscription field and the current and earlier versions of the signature list. The method starts at step 1001. At step 1002, the method compares the new segment signature to an old segment signature. Here, the new segment refers to segments within the current version of the subscription file; the old segment signature refers to segment signatures within the earlier version of the subscription file. For example, each of the segment signatures 311 through 316 shown in FIGS. 3 and 4 are old segment signatures, while each of the signatures 701 through 707 shown in FIG. 7 represent new segment signatures. Step 1002 begins with the first new segment signature in the current version of the subscription file. For example, step 1002 begins with the segment signature 701 pertaining to segment B1. Step 1002 compares the new segment signature to the old segment signature. Step 1002 begins with the first old segment signature, for example the segment signature 311 corresponding to segment A1 shown in FIG. 4.

If step 1002 determines that there is a match between the new segment signature and the old segment signature, then the method 1000 writes a command in the update file to copy the old segment into the client computer's copy of the current version of the subscription file at step 1003. Then step 1007 determines if the last new segment signature in the new signature list has been processed and if so, the method is done at step 1009. For example, when the method gets to the new segment signature 707 corresponding to segment B7, step 1007 will indicate that the method is done. However, if there are more new segment signatures to be processed, step 1007 delivers the message to step 1008 which retrieves the next new segment signature, and then returns the method to step 1002. If there is not a match between the new segment signature and the old segment signature, then step 1002 delivers the method to step 1004, where it is determined whether or not the last old segment signature in the old signature list has been compared to the new segment signature. If test 1004 determines that there are no more old segment signatures in the old signature list, for example the segment signature 316 corresponding to segment A6 shown in FIG. 4, then test 1004 delivers the method to step 1006 where the server computer writes a command in the update file to insert the new segment into the client computers copy of the current version of the subscription file. In other words, if step 1006 is reached, then there were no matches for the new segment signature in the old segment signature list. Then the method reverts to test 1007. If test 1004 determines that there are more old segment signatures in the old signature list, then the next old segment signature is considered at step 1006 and the method reverts to step 1002 for comparison of the new segment signature to the old segment signature.

Figure 11:
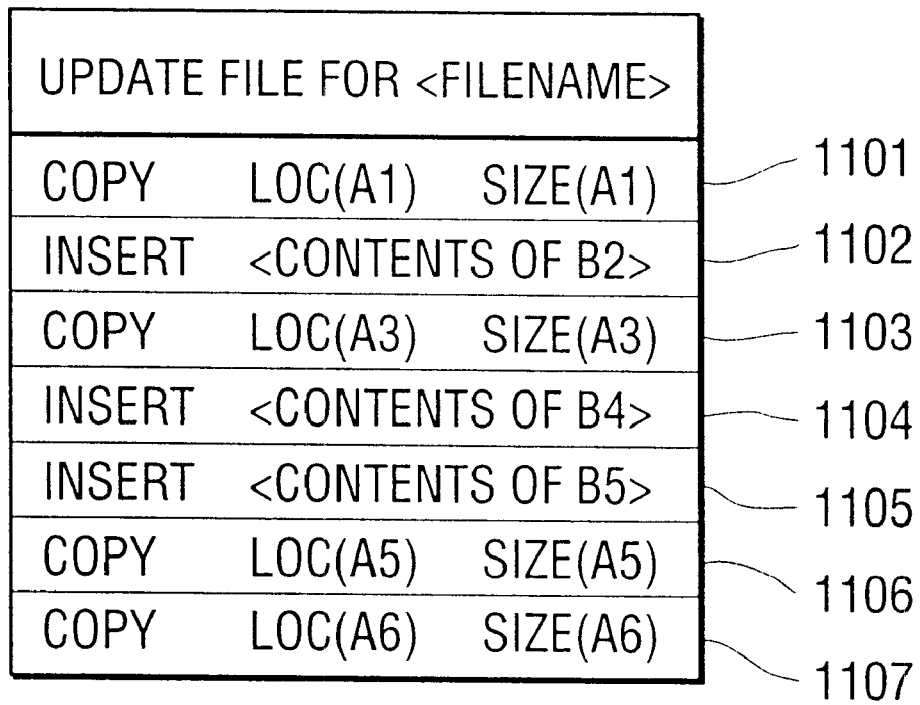
FIG. 11 illustrates an update file generated by the method according to the present invention illustrated in FIG. 10 applied to the earlier and current versions of the signature list illustrated in FIGS. 4 and 7, respectively.

FIG. 11 shows the update file which is communicated to the client computer 202 via electronic mail. Although the preferred embodiment of the present invention involves electronic mail transmission of the update file to the client computer 201, there is no requirement that an electronic mail facility be used. FIG. 11 illustrates an update file generated by the method according to the present invention illustrated in FIG. 10 applied to the earlier and current versions of the signature list illustrated in FIGS. 4 and 7, respectively. The update file 1100 shown in FIG. 11 is preferable an executable attachment to an electronic mail that is received by the client computer 201. The command 1101 implements the copy of segment A1 into segment C1 illustrated by the arrow 910 shown in FIG. 9. The insert command 1102 implements the insertion of the segment B2 into segment C2 by arrow 920 shown in FIG. 9. The copy command 1103 implements the copying of segment A3 into segment C3 shown by arrow 911 in FIG. 9. The command 1104 implements the copying of segment B4 into segment C4 illustrated by arrow 921 shown in FIG. 9. The command 1105 implements the copying of segment B5 into segment C5 illustrated by the arrow 922 shown in FIG. 9. The command 1106 implements the copying of the segment A5 into segment C6 illustrated by arrow 912 shown in FIG. 9. The copy command 1107 implements the copying of segment A6 into segment C7 illustrated by arrow 913 in FIG. 9. Each of the copy commands 1101, 1103, 1106, and 1107 must specify for the client computer 201 where the segments to which they pertain are actually stored on the client computer.

Because the client computer does not store the signature lists or have any knowledge of the fact that the subscription files are broken into segments by the server computer, the update file must include address information necessary to effectuate the copying of the correct bytes into the copy of the current version of the subscription file. Thus, the location and size of each segment are included as arguments to each of the copy commands so that the client computer can compute the address of the correct bytes. The client computer stores the copies of the subscription files as standard files within its operating system and only knows the beginning location and size of the entire file. The location and size information included in each copy command by the server computer 203 is combined with the file offset value at the client computer in order for the client computer to calculate the range of addresses to be copied. In addition, the server computer 203 has no way of knowing where exactly on the client computer's hard disk that the client computer stored the earlier version of the subscription file. The insert commands 1102, 1104, and 1105 include the actual contents of the segments B2, B4, and B5, respectively. Although the segment size is variable, the inclusion of the actual contents of the new or changed segments B2, B4, and B5 represent the vast bulk of the update file 1100. In other words, the copy commands 1101, 1103, 1106, and 1107 are negligible in size in comparison to the contents of the actual new or changed segments which must be transmitted. In fact, in FIG. 9, the update file 902 and in FIG. 8, the update file 801, are illustrated solely by the contents of the segments B2, B4, and B5 and omit illustrating the actual copy and insert commands because they are negligible in size to the actual content of the transmitted segments. Because the segments are transmitted via electronic mail, they may be further compressed to reduce their size and thereby minimize connection time in receiving the electronic mail. Because the update file is often transmitted over an insecure communication medium, such as the internet, the update file 902 is optionally encrypted for security purposes according to the present invention.

Once a delta or Update File has been generated, the server creates an email message and sends the Update File as a simple binary attachment to the user. The user then receives updates through the user's standard email client.

For mobile professionals, this means making one connection to the network to receive all messages and document updates. It also means that the size of the attachment is a fraction of the full file, containing only the changes to be applied. In other words, the user performs the standard task of checking email — i.e. a task that is familiar, secure, and, for the most part, reliable. Once an Update Message arrives, the user simply launches or opens the attachment (again, in a way they are most familiar with) and the Mobile Update Agent processes the changes automatically. It does this by substituting the new and modified segments in the Update File with the segments in the existing file, as illustrated in FIG. 9.

As shown in FIG. 9, segment B2 is a replacement segment for A2 in the current file. A2 is removed and B2 takes its place. Segment B4 is a brand new segment that fits in after A3, and the files to the right of it (i.e., A4, A5, and A6) are moved over by one segment. Finally, segment B5 replaces A4 as it is the modified segment for A4. The last two segments in the original file (A5 and A6) are reused. The updated file on the hard drive now has an identical "binary profile" or "snapshot" to the second snapshot taken by the server. For the next file change, the server will take yet another snapshot and compare it against the latest snapshot and so on.

The Mobile Update Server according to the present invention preferably runs as a service under Windows NT 4.0 (Workstation or Server) and can run across virtually any network operating system that supports Windows NT. However, it should be noted that the server according to the present is alternatively implemented so as to run under any operating system. The server according to the present invention requires its own mail client (account) that is capable of sending and receiving email messages through the corporate mail server. The server uses the mail client to receive and process email-based subscription changes and requests automatically generated by clients when they are in off-line mode (i.e., not connected to the network). It also uses the mail client to create and send notification and update requests to its users. In addition, the server requires a network account with access rights that encompass those of its users, i.e. it should at least share the same profile as its users. This allows the server to access network files on the user's behalf to check for changes.

When installing the server, the administrator specifies where client install files should be located on the network for easy install access by users. Once the server is set up, the user installs the client from the network drive. Each client is registered with the server and writes its user name, email address, etc., to the server's database. The client can now subscribe to any network-based files located on a shared directory.

Figure 12:
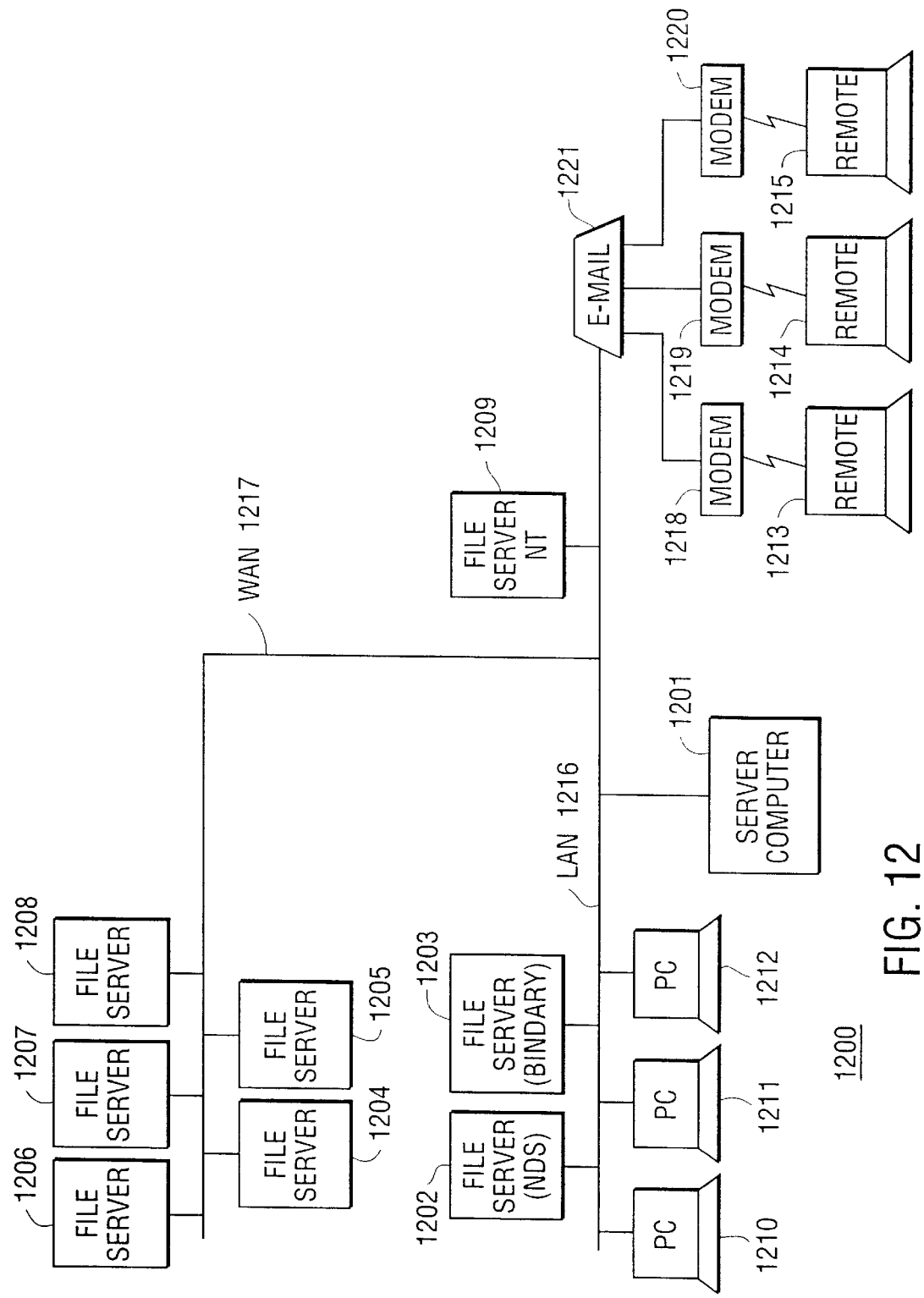
FIG. 12 illustrates a large and diverse network of computers suitable for implementing, the methods according to the present invention.
Figure 9:
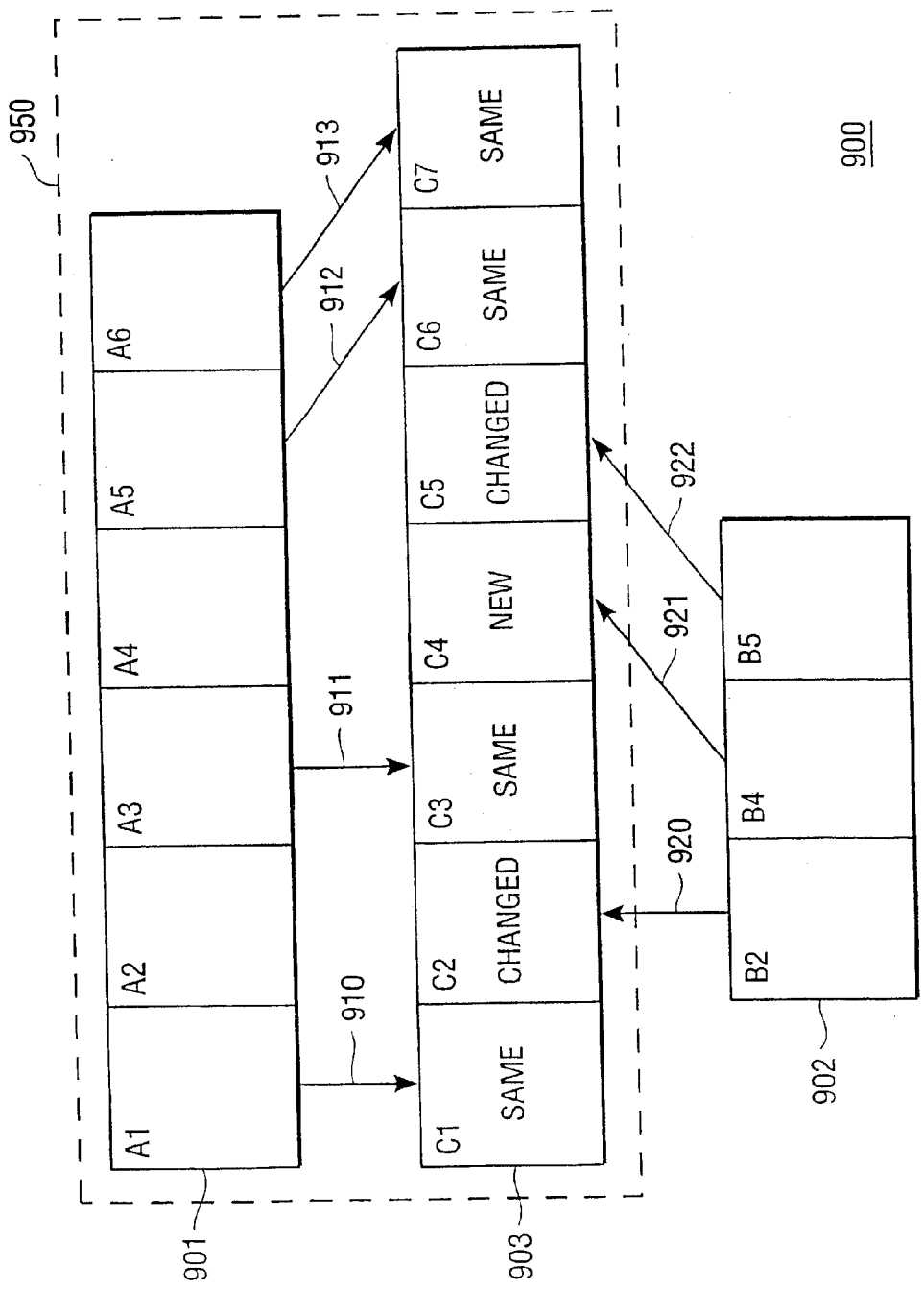
Figure 10:
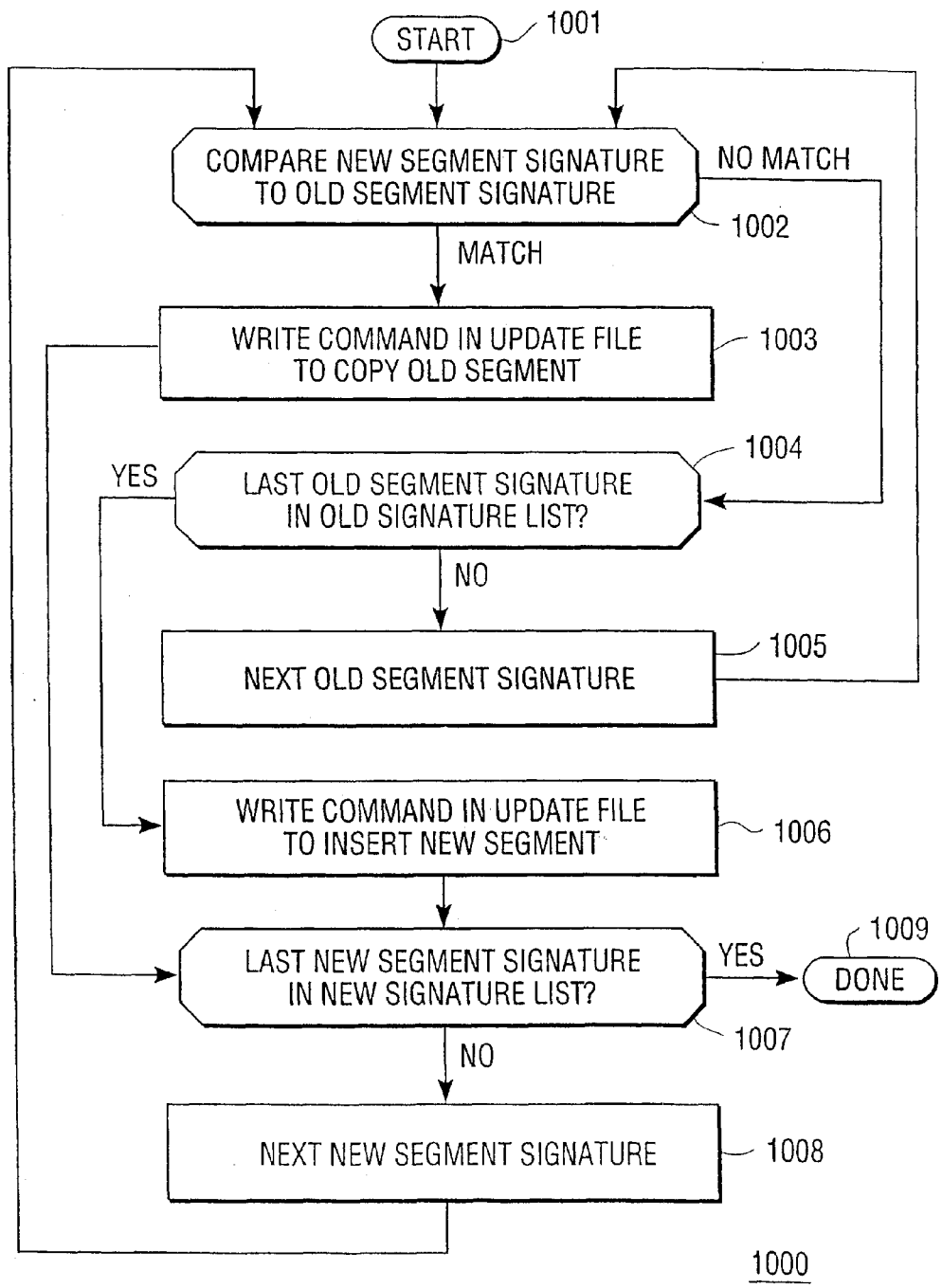

FIG. 12 illustrates a large and diverse network of computers suitable for implementing the methods according to the present invention. Specifically, the server computer 1201 accesses subscription files stored on any of the file servers 1202 through 1209. The personal computers 1210 through 1212 are connected to local area network 1216. Remote personal computers 1213 through 1215 dial in to modems 1218 through 1220 respectively in order to receive their electronic mail from the electronic mail facility 1221 and receive update files corresponding to the subscription files to which they subscribe.

FIG. 12 illustrates a sample deployment for Mobile Update according to the present invention. The clients runs in both on-line mode and off-line mode. The client runs in on-line mode when it is on the network where it can communicate directly with the server's database. The client runs in off-line mode when the user is mobile and not connected to the network.

In the off-line mode according to the present invention, the user communicates with the server through email messaging. If changes are made to the properties of a subscription, such as a change in polling frequency or a re-sync request is made, the Mobile Update client automatically generates an email message to the server which is then placed in the outbox of the user's mail client. These messages are then sent when the user logs on to check or send e-mail. The messages are then received by the server's mail client and parsed and processed accordingly. The Mobile Update Server according to the present invention can access virtually any WAN-based server, providing it has the necessary network access rights, as illustrated in FIG. 12.

Symantec Mobile Update (SMU) according to the present invention is the first solution in the document delivery or "push" category in which currently existing data like reports, spreadsheets, presentations, etc., are delivered to the desk-top 'intelligently'. It does this by watching the network files of folders for changes, delivering "just the changes" or notifies of changes, uses one familiar and reliable connection to deliver those changes (email), and provides seamless functionality, thereby leveraging the way users currently work (in email).

Document push, like software push, is only compelling if it can deliver clear value to end-users and corporate IS. Mobile Update according to the present invention offers two tiers of benefits to corporations. For the mobile user, it receives updates anywhere, anytime (location-independent), it stays up-to-date on changes to key documents, it reduces download time for email attachments, and it reduces the hassle of accessing changes to key documents. For MIS personnel, it easily and effectively keeps mobile employees connected to corporate, LAN-based files, it reduces the length of connection times (quicker email downloads), it reduces the number of connections made (leverages email connection), and it reduce the size of email attachments (delta technology).

Although the present invention has been described with respect to its preferred embodiment, that embodiment is offered by way of example, not by way of limitation. It is to be understood that various additions and modifications can be made without departing from the spirit and scope of the present invention. Accordingly, all such additions and modifications are deemed to lie with the spirit and scope of the present invention as set out in the appended claims.

What is claimed is:

1. A method for a server computer to generate an update file for transmission to a client computer that permits the client computer to generate a copy of a current version of a subscription file comprised of a first plurality of file segments from a copy of an earlier version of the subscription file comprised of a second plurality of file segments, such that each file segment corresponds to a portion of its respective subscription file, the method comprising the steps of:

for each segment of the current version of the subscription file,
   (a) searching an earlier version of a signature list corresponding to an earlier version of the subscription file for an old segment signature which matches a new segment signature corresponding to the segment;
   (b) if step (a) results in a match, writing a command in the update file for the client computer to copy an-old segment of the client computer's copy of the earlier version of the subscription file into the client computer's copy of the current version of the subscription file, wherein the old segment corresponds to the segment for which a match was detected in step (a); and
   (c) if step (a) results in no match, writing a command in the update file for the client computer to insert a new segment of the current version of the subscription file into the client computer's copy of the current version of the subscription file;

wherein the new segment of the current version of the subscription file is written into the update file and the unchanged segment is excluded from the update file; and wherein steps (a) through (c) are performed by the server computer, without interaction with the client computer, in response to the server computer detecting a change between the current version of the subscription file and the earlier version of the subscription file.

2. A method as in claim 1, wherein the new segment of the current version of the subscription file is compressed.

3. A method as in claim 1, wherein the new segment of the current version of the subscription file is encrypted.

4. A method as in claim 1, wherein the new segment of the current version of the subscription file is retrieved by the server computer from a network drive.

5. A method as in claim 1, further comprising the step of:
(d) transmitting the update file to the client computer as an executable attachment by electronic mail, wherein the executable attachment will cause the client computer to generate a copy of the current version of the subscription file from the copy of the earlier version of the subscription file, in response to the client computer executing the attachment.

6. A method as in claim 5, further comprising the step of:
prior to step (a), performing a check on the current version of the subscription file to determine if the subscription file has been altered since a previous check and continuing to perform the remaining steps only if the check determines that the current version of the subscription file has been altered.

7. A method as in claim 6, wherein the step of performing a check is performed at periodic intervals.

8. A method as in claim 6, wherein the step of performing a check on the current version of the subscription file comprises checking a current time stamp of the current version of the subscription file to determine whether it differs from an earlier time stamp of the subscription file.

9. A computer readable storage medium, comprising:
computer readable program code embodied on said computer readable storage medium, said computer readable program code for programming a computer to perform a method for a server computer to generate an update file for transmission to a client computer that permits the client computer to generate a copy of a current version of a subscription file comprised of a first plurality of file segments from a copy of an earlier version of the subscription file comprised of a second plurality of file segments, such that each file segment corresponds to a portion of its respective subscription file, the method comprising the steps of:
for each segment of the current version of the subscription file,
(a) searching an earlier version of a signature list corresponding to an earlier version of the subscription file for an old segment signature which matches a new segment signature corresponding to the segment;
(b) if step (a) results in a match, writing a command in the update file for the client computer to copy an old segment of the client computer's copy of the earlier version of the subscription file into the client computer's copy of the current version of the subscription file, wherein the old segment corresponds to the segment for which a match was detected in step (a); and
(c) if step (a) results in no match, writing a command in the update file for the client computer to insert a new segment of the current version of the subscription file into the client computer's copy of the current version of the subscription file;
wherein the new segment of the current version of the subscription file is written into the update file and the unchanged segment is excluded from the update file; and wherein steps (a) through (c) are performed by the server computer, without interaction with the client computer, in response to the server computer detecting a change between the current version of the subscription file and the earlier version of the subscription file.

10. A computer readable storage medium as in claim 9, wherein the new segment of the current version of the subscription file is compressed.

11. A computer readable storage medium as in claim 9, wherein the new segment of the current version of the subscription file is encrypted.

12. A computer readable storage medium as in claim 9, wherein the new segment of the current version of the subscription file is retrieved by the server computer from a network drive.

13. A computer readable storage medium as in claim 9, further comprising the step of:
(d) transmitting the update file to the client computer as an executable attachment by electronic mail, wherein the executable attachment will cause the client computer to generate a copy of the current version of the subscription file from the copy of the earlier version of the subscription file, in response to the client computer executing the attachment.

14. A computer readable storage medium as in claim 13, the method further comprising the step of:
prior to step (a), performing a check on the current version of the subscription file to determine if the subscription file has been altered since a previous check and continuing to perform the remaining steps only if the check determines that the current version of the subscription file has been altered.

15. A computer readable storage medium as in claim 14, wherein the step of performing a check is performed at periodic intervals.

16. A computer readable storage medium as in claim 14, wherein the step of performing a check on the current version of the subscription file comprises checking a current time stamp of the current version of the subscription file to determine whether it differs from an earlier time stamp of the subscription file.

17. A computer system, comprising:
a processor; and
a processor readable storage medium having processor readable program code embodied on said processor readable storage medium, said processor readable program code for programming a computer to perform a method for a server computer to generate an update file for transmission to a client computer that permits the client computer to generate a copy of a current version of a subscription file comprised of a first plurality of file segments from a copy of an earlier version of the subscription file comprised of a second plurality of file segments, such that each file segment corresponds to a portion of its respective subscription file, the method comprising the steps of:
for each segment of the current version of the subscription file,
(a) searching an earlier version of a signature list corresponding to an earlier version of the subscription file for an old segment signature which matches a new segment signature corresponding to the segment;

(b) if step (a) results in a match, writing a command in the update file for the client computer to copy an old segment of the client computer's copy of the earlier version of the subscription file into the client computer's copy of the current version of the subscription file, wherein the old segment corresponds to the segment for which a match was detected in step (a); and (c) if step (a) results in no match, writing a command in the update file for the client computer to insert a new segment of the current version of the subscription file into the client computer's copy of the current version of the subscription file;

wherein the new segment of the current version of the subscription file is written into the update file and the unchanged segment is excluded from the update file, and wherein steps (a) through (c) are performed by the server computer, without interaction with the client computer, in response to the server computer detecting a change between the current version of the subscription file and the earlier version of the subscription file.

18. A computer system as in claim 17, wherein the new segment of the current version of the subscription file is compressed.

19. A computer system as in claim 17, wherein the new segment of the current version of the subscription file is encrypted.

20. A computer system as in claim 17, wherein the new segment of the current version of the subscription file is retrieved by the server computer from a network drive.

21. A computer system as in claim 17, further comprising the step of:

(d) transmitting the update file to the client computer as an executable attachment by electronic mail, wherein the executable attachment will cause the client computer to generate a copy of the current version of the subscription file from the copy of the earlier version of the subscription file, in response to the client computer executing the attachment.

22. A computer system as in claim 21, the method further comprising the step of:

prior to step (a), performing a check on the current version of the subscription file to determine if the subscription file has been altered since a previous check and continuing to perform the remaining steps only if the check determines that the current version of the subscription file has been altered.

23. A computer system as in claim 22, wherein the step of performing a check is performed at periodic intervals.

24. A computer system as in claim 22, wherein the step of performing a check on the current version of the subscription file comprises checking a current time stamp of the current version of the subscription file to determine whether it differs from an earlier time stamp of the subscription file.

* * * * *

UNITED STATES PATENT AND TRADEMARK OFFICE
CERTIFICATE OF CORRECTION

PATENT NO.      : 6,574,657 B1
DATED           : June 3, 2003
INVENTOR(S)     : Peter Dickinson It is certified that error appears in the above-identified patent and that said Letters Patent is hereby corrected as shown below:

<u>Drawings,</u>
Sheets 9 and 10, consisting of Figs. 9 and 10, should be deleted and replaced therefore with the Sheets 9 and 10, consisting of Figs. 9 and 10, as shown on the attached pages.

Signed and Sealed this

Twentieth Day of January, 2004

JON W. DUDAS
*Acting Director of the United States Patent and Trademark Office*